US008676668B2

(12) United States Patent
Wolfe

(10) Patent No.: US 8,676,668 B2
(45) Date of Patent: Mar. 18, 2014

(54) METHOD FOR THE DETERMINATION OF A TIME, LOCATION, AND QUANTITY OF GOODS TO BE MADE AVAILABLE BASED ON MAPPED POPULATION ACTIVITY

(75) Inventor: Andrew Wolfe, Los Gatos, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 672 days.

(21) Appl. No.: 12/540,324

(22) Filed: Aug. 12, 2009

(65) Prior Publication Data

US 2011/0040603 A1 Feb. 17, 2011

(51) Int. Cl.
*G06Q 30/00* (2012.01)

(52) U.S. Cl.
USPC ............ 705/26.7; 705/14.49; 705/14.58; 705/7.31; 701/408; 701/487; 701/491; 701/516; 701/526

(58) Field of Classification Search
USPC ................ 705/7.29, 7.31, 14.4, 14.49, 705/14.57–14.58, 26.1–27.2; 701/400, 408, 701/426, 465, 487, 491, 500, 516, 517, 526
See application file for complete search history.

(56) References Cited

U.S. PATENT DOCUMENTS

| | | | |
|---|---|---|---|
| 6,885,936 B2 * | 4/2005 | Yashio et al. ................. 701/515 |
| 7,103,370 B1 * | 9/2006 | Creemer ..................... 455/456.3 |
| 7,386,485 B1 * | 6/2008 | Mussman et al. ............ 705/14.1 |
| 8,073,460 B1 * | 12/2011 | Scofield et al. ............ 455/456.1 |
| 2007/0260485 A1 * | 11/2007 | Shibata et al. ..................... 705/2 |
| 2008/0004733 A1 * | 1/2008 | Finley et al. ..................... 700/94 |
| 2008/0045234 A1 * | 2/2008 | Reed .......................... 455/456.1 |
| 2009/0125343 A1 * | 5/2009 | Cradick et al. ..................... 705/7 |
| 2009/0171749 A1 * | 7/2009 | Laruelle et al. ................. 705/10 |
| 2009/0197616 A1 * | 8/2009 | Lewis et al. ................ 455/456.1 |
| 2010/0042469 A1 * | 2/2010 | Chandrasekar et al. ........ 705/10 |
| 2010/0121716 A1 * | 5/2010 | Golan ......................... 705/14.58 |
| 2010/0153174 A1 * | 6/2010 | Angell et al. ................... 705/10 |
| 2010/0223641 A1 * | 9/2010 | Hubbard ......................... 725/35 |
| 2011/0022469 A1 * | 1/2011 | Fukui et al. ................. 705/14.58 |
| 2011/0035284 A1 * | 2/2011 | Moshfeghi ................. 705/14.58 |
| 2011/0066479 A1 * | 3/2011 | Benson ........................ 705/14.4 |
| 2011/0124324 A9 * | 5/2011 | Friedenthal et al. .......... 455/418 |
| 2011/0276382 A1 * | 11/2011 | Ramchandani et al. ... 705/14.25 |

OTHER PUBLICATIONS

Personal Journal; Automotive Report: Mapping the Progress of Navigation Tools falseSapsford, Jathon. Wall Street Journal, Europe [Brussels] Jul. 29, 2005: p. 4.*

* cited by examiner

*Primary Examiner* — William Allen
(74) *Attorney, Agent, or Firm* — Moritt Hock & Hamroff LLP; Steven S. Rubin, Esq.

(57) ABSTRACT

A population activity mapping method may include detecting a plurality of wireless mobile devices within a geographic region. Individual wireless mobile devices may include a processor, a user interface, a transmitter and a receiver. The detecting operation may be performed by use of a wireless access point, a GPS satellite, and/or a base station, and may be performed at at least two different points in time. Input data may be provided based upon the detecting operation. A distance and speed at which the mobile devices travel within the geographic region may be discerned dependent upon the input data. The discerning operation is performed by at least one processor of a computer network. A time and/or location at which salable output is to be made available and/or an amount of salable output to be made available may be determined dependent upon the discerning operation.

7 Claims, 5 Drawing Sheets

METHOD FOR THE DETERMINATION OF A TIME, LOCATION, AND QUANTITY OF GOODS TO BE MADE AVAILABLE BASED ON MAPPED POPULATION ACTIVITY

BACKGROUND

Providing goods and/or services to a group of people at a particular time and place presents numerous logistical problems. A particular problem that arises is that some customers demand prompt service or otherwise a sales opportunity may be lost. A large number of businesses and other agencies provide goods and services that are valuable to consumers only when they can be provided at a proper time and place. Moreover, these goods and services may call for some advance planning immediately prior to providing the goods or services to such customers. This may be a particular problem when dealing with crowds, e.g., when large numbers of potential customers demand prompt service at a given time, and if no such service is provided, then opportunities to be a service provider may be lost.

BRIEF DESCRIPTION OF THE SEVERAL VIEWS OF THE DRAWING

The foregoing and other features of the present disclosure will become more fully apparent from the following description and appended claims, taken in conjunction with the accompanying drawings. Understanding that these drawings depict only several embodiments in accordance with the disclosure and, therefore, are not to be considered limiting of its scope, the disclosure will be described with additional specificity and detail through use of the accompanying drawings.

In the drawings.

DETAILED DESCRIPTION

Figure 1:
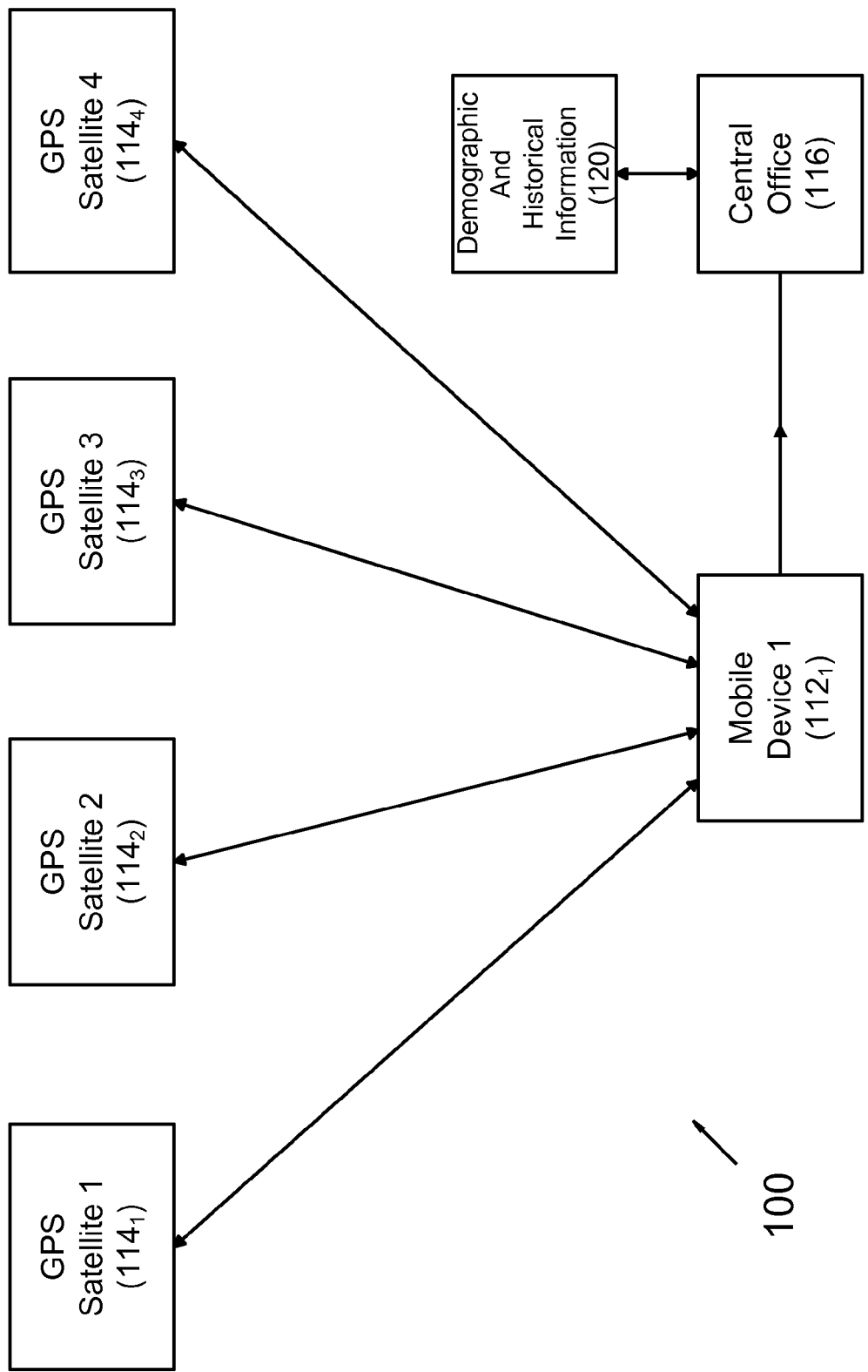
FIG. 1 is a block diagram of an example arrangement for determining and/or collecting the location of a mobile device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods and systems related to telemetrics-based location and/or tracking technology. An example embodiment may relate to determining the locations of wireless devices (e.g., cell phones), and this information may be used in conjunction with population density maps, population activity maps, and/or transaction likelihood maps, in order to match-up clients and/or vendors.

This disclosure may include methods and systems for providing details of where crowds of people are located, how the crowds are changing, where they are moving to, when they are transitioning from one activity to another, and/or what activity they are transitioning to. Because the people in the crowd may want or need to purchase a provider's goods or services, it may be valuable to the provider to know such information about the crowd.

There are many example applications of the present disclosure which may enable goods and services to be provided in a better and/or more responsive fashion by virtue of having determined and/or reported a crowd's location, pattern of movement, and/or activity level. In one example, a taxi service may be informed of when and how many passengers will be arriving, are arriving, and/or have arrived at an airport, bus station or train station so that the taxi service may dispatch an appropriate number of taxis at an appropriate time to the airport, bus station or train station. The taxi service may be informed of how many passengers are arriving, how many passengers are exiting the airport, bus station or train station as opposed to making connections, and/or which exits the passengers are using. In addition, the taxi service may be informed of when and how many passengers have arrived at baggage claim areas. The earlier and more accurately such crowd information can be predicted and/or provided, the greater the number of taxi fares that may be received with less time waiting on the part of the taxi drivers.

In another example, outdoor food vendors may be informed of when exactly crowds begin to leave theaters or when office workers begin leaving for lunch. Being armed with such information, the food vendors may be better able to prepare and provide appropriate amounts of food at appropriate times.

In another example, a police force may be informed of the distribution of people around a city and/or changes in activity levels in specific locations around a city. Based on this information, the police force may better position its patrol officers to locations around the city where the officers may be needed.

In another example, a city government may be informed of the number of attendees at a city-sponsored event. Thus, the city government may gauge the level of the citizen's interest in the event.

In yet another example, an ambulance service may be informed of the locations of people, and consequently their vehicles, on the roadways. The ambulance service may use this information to create a traffic congestion model in order to determine the best, most uncongested, and/or quickest route for an ambulance to take to the location of an emergency, and/or from the location of the emergency to a hospital.

The present disclosure contemplates that a modern population of consumers may include a substantial and relatively predictable percentage of people who possess a mobile phone or other wireless device that may be in contact with a network, such as a wide area network. The disclosure may provide techniques that may be used to determine and/or report the locations of each of these terminal devices. These techniques may include GPS-based location determination techniques and/or Wi-Fi-based or cell-tower-based location determination techniques, which may involve triangulation.

Once the individual location data is gathered, aggregation algorithms may be used to create a model of the distribution of the locations of the mobile device users. Population estimation models may be used to determine or estimate size and location of crowds based on this aggregated information.

Demographic information about each of the users may be collected, and this demographic information may be used to derive or estimate characteristics of the crowds, such as the number of men or women in a certain age group.

The changing locations of the mobile device users may continue to be monitored, and the motion of individual terminals may be aggregated to estimate the movement of a crowd or to estimate changes in activity levels. Alternatively, the flow of terminals from one geographic cell or area to another may be used to estimate motion or activity.

Instead of tracking the changing locations of individual terminals, changes in the terminal locations as a group, regardless of their individual identities or individual motions, may be monitored. Thus, "snapshots" of the group locations may be taken at periodic time intervals without regard to the identities of the individual terminals.

Regardless of whether the aggregated information relates to individual terminals or only to a group of the terminals as a whole, the aggregated information may be provided to providers of goods and/or services. The aggregated information may be provided directly to providers of goods and/or services in an unfiltered state. Alternatively, there may be applied an analysis protocol that may determine which information is of interest to which provider. Thus, each provider may receive only the filtered information in which he is interested or is willing to purchase. The providers of goods and/or services may then use the filtered or unfiltered information to decide the location, timing and/or quantity of goods and services to provide.

FIG. 1 is a block diagram of an example arrangement 100 for determining and/or collecting the location of a mobile device, which is arranged in accordance with at least some embodiments of the present disclosure. The example arrangement 100 includes a mobile device $112_1$ which a user may carry with him or on his person. Mobile device $112_1$ may be a cell phone and/or another form of wireless device which may include a radio receiver, radio transmitter, processor and/or user interface. Mobile device $112_1$ may include a built-in GPS receiver and may be in communication with satellites $114_1$, $114_2$, $114_3$ and $114_4$. Mobile device may determine its global geographic coordinates via communication with the satellites in conjunction with trilateration and/or other techniques. Mobile device $112_1$ may then wirelessly communicate its location to a central office 116 or other centralized depository of mobile device location information. Central office 116 may be communicatively coupled to a memory device 120 which may store mobile device locations.

In another embodiment in which the mobile device is not GPS-equipped, the mobile device may communicate with cell phone towers to determine its approximate global location and transmit the location to the central office. It is also possible for one or more of the cell phone towers or the wireless service provider company to determine the location of the mobile device and transmit the location to the central office. For example, the iPhone 3G from Apple Computer can determine its approximate location using either GPS or a combination of proximate wireless access points.

Figure 2:
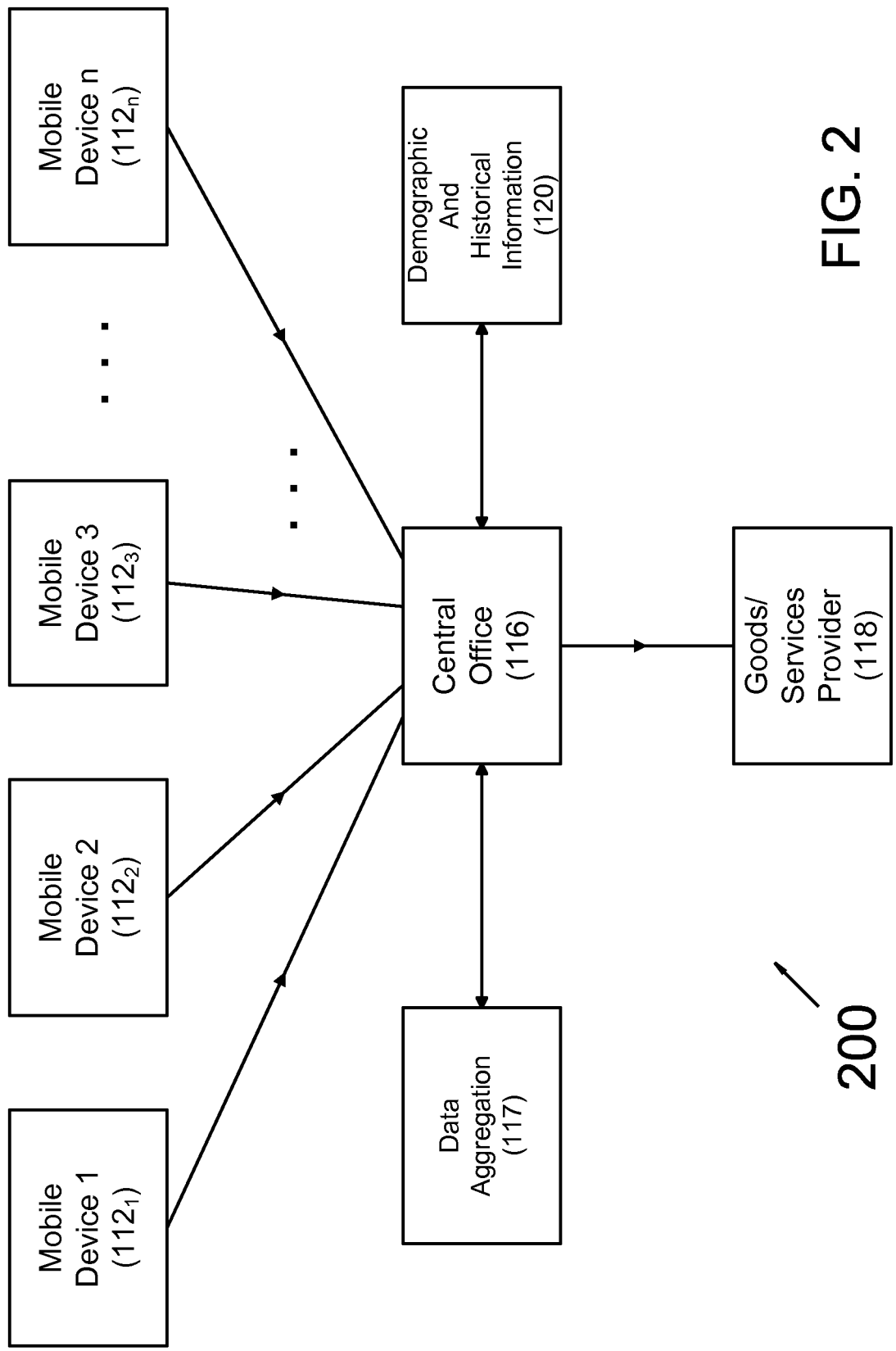
FIG. 2 is a block diagram of an example telemetrics-based location and/or tracking arrangement.

FIG. 2 is a block diagram of an example telemetrics-based location and/or tracking arrangement 200 including mobile device $112_1$ and central office 116, which were described above with regard to FIG. 1, as well as other mobile devices $112_2$, $112_3$, ..., $112_n$ (where n is any number), a goods and/or services provider 118, and a memory device 120 storing demographic and historical information. Each of the n number of mobile devices $112_1$, $112_2$, $112_3$, ..., $112_n$ may determine its location via communication with GPS satellites and/or cell phone towers, and then wirelessly transmit its identity and its location to central office 116.

Central office 116 may store the received mobile device locations in memory device 120. In one embodiment memory device 120 may store mobile device locations on a first in first out basis such that only the most recent locations are stored. In another embodiment, historical location data that is over a few hours old may be compressed to store only representative location data and/or sampled location data. For example, memory device 120 may store one to three locations that each mobile device spent the most time at during each day in the past.

Central office 116 may also store demographic information related to each of the people who carry mobile devices 112. Central office 116 may receive such demographic information from mobile device carrier companies that bill the people who carry mobile devices 112 for their use of the wireless network. Alternatively, or in addition, central office 116 may receive such demographic information directly from the owners of mobile devices 112 and/or from third parties.

Central office 116 may be communicatively coupled to a data aggregation module 117. Central office 116 may store and run aggregation algorithms on the new location data from mobile devices 112 and/or on the demographic and historical data from memory device 120. The output of the aggregation algorithms may include a model of the distribution of the locations of mobile devices 112. This model may be used by central office 116 to estimate the size and/or location of crowds including the users of mobile devices 112. The demographic information retrieved from memory device 120 may be used to derive and/or estimate characteristics of the crowds represented by mobile devices 112, such as the number of men or women broken down by age groups, monetary income levels, and/or where the people live (which may be used as a proxy for where they are going).

Central office 116 may transmit the crowd information, which may include the crowd's demographics, number of people, locations, and/or patterns of movement, to goods and/or services provider 118. Provider 118 may then estimate the demands of the crowd for the provider's goods and/or services, including quantities and/or times, based at least in part on the received crowd information. Hence, provider 118 may prepare to supply a level or number of goods and/or services that corresponds to, or is appropriate for, the anticipated demands of the crowd.

Many central offices may be provided, and individual central offices 116 may be associated with certain respective geographic areas. In one embodiment, each geographic area may measure about a square mile, which may correspond to an area that the crowd is expected, during the next one to two hours, to traverse on foot, and/or to purchase goods and/or services within. Central office 116 may filter the crowd information on a geographic basis, and thus use, or transmit to provider 118, only the crowd information that is of interest to provider 118. For example, central office 116 may transmit to provider 118 information only about mobile devices 112 that are within a half-mile radius of provider 118.

In one embodiment, central office 116 may be in communication with only mobile devices 112 that are within the geographic area with which central office 116 is associated. In another embodiment, mobile devices 112 may be in communication with their corresponding wireless service carriers, and the carriers may determine the locations of mobile devices 112. Each of the wireless service carriers may then send to each central office 116 only information about mobile devices 112 that are within the geographic area with which that particular central office 116 is associated.

In another embodiment, central office 116 may include a wireless access point in a retail store, library, and/or other public place. Mobile devices 112 may connect with the wireless access point only within a range of about one hundred meters, and thus the locations of the individual mobile devices 112 may not need to be specified with any greater precision. However, in this embodiment, central office 116 may still receive demographic information from a wireless carrier or other source about the mobile devices that are in communication with the wireless access point.

Static Population Density Map

In one embodiment contemplated by the present disclosure, a static population density map may be provided. A first operation of this process may include determining the locations of individual accessible phones and/or data terminal customers. For example, mobile devices 112 within the geographic area of a central office 116, and/or the wireless carriers of such mobile devices, may report the exact locations of the mobile devices within the geographic area to central office 116.

As alluded to above, determining the location of each accessible phone and/or data terminal customer may possibly involve aggregating data from multiple sources. For example, data from the wireless service carriers, cell phone towers, third parties connected to the wireless service carriers or cell phone towers, and/or from the mobile devices themselves may be collected and integrated together by central office 116.

Another operation of the static population density map process may involve assigning the detected mobile device locations to geographic regions. For example, each central office 116 may be associated with one or more respective geographic regions, such as an area in which potential common customers and/or clients of retailers within the geographic region may be congregated. However, it is to be understood that one central computer system may be arranged to create the maps and the associated data structures for many or all of the regions. Such a central computer system may be communicatively coupled to each of a plurality of central office's 116. In one embodiment, the geographic region may be a set rectangular area within a city, such as a one mile by one mile square. In other embodiments, the geographic region may be defined at least in part by barriers to travel (e.g., foot travel), such as a river, highway, lake, private property, fence, and/or difficult terrain, for example. Thus, central office 116 may determine in which of the geographic regions that each mobile device 112 is disposed.

Yet another operation of the static population density map process may involve estimating the population of interest for individual regions. For example, not all people, and not all people carrying a mobile device 112, may realistically qualify as a potential client and/or customer for every product and/or service. The pool of people in the region may be filtered based upon the time-of-day, day of the week, calendar date, historical information, and/or demographic information to identify people who have above a threshold level of likelihood of purchasing the particular goods and/or services of a provider 118. In one embodiment, the population of interest may be estimated by accessing stored demographic and/and historical information about each detected client. For example, central office 116 may retrieve demographic and/and historical information about mobile devices 112 from memory device 120. The historical information may include a number of times, and/or a frequency with which, a particular mobile device 112 has visited provider 118.

Estimating the population of interest may also involve filtering and/or weighting detected potential clients according to search criteria. For example, the detected population of mobile device 112 users may be broken down by the sex, age, income level, and/or place of residence of the users. Estimating the population of interest may further involve applying an estimation function to predict the actual potential customer base. This function may depend on: detected client locations; client demographic and historical information; source of client location data; and/or the day of week and time-of-day. For example, a formula or lookup table may be used to estimate an expected level of sales for individuals detected within the region. Variables in the formula/lookup table may include the current location of the person, his demographic and/or historical location information, how reliable the source of the client location data is, and/or the day of the week, time-of-day, and/or season of the year. The formula/lookup table may be based on and/or derived from historical sales data, which data may relate to any of the variables and/or parameters used in the formula.

In one example, a taxi company may have derived a formula based on historical data for the likelihood that an individual at an airport will hail a cab. According to the formula, the likelihood may be estimated as the sum total of four parameters that depend on the above-described variables. For instance, the first parameter may be 0.02 if the person is at a gate area of the airport, and 0.07 if the person is at a baggage claim area. The second parameter may be 0.03 if the person lives in the state, and 0.08 if he does not. The third parameter may be 0.06 if the user location data was received from a wireless service provider, and 0.03 if received from a less reliable third party. The fourth parameter may be 0.05 on a weekday, and 0.03 on a weekend. Thus, for a person currently at the gate area (0.02), who lives in the state (0.03), whose information was received from a third party (0.03), and for a weekday (0.05), the formula may indicate a probability of 0.13, or 13 percent, that the person will attempt to hail a cab. By summing the estimated probabilities for individuals determined to be in the region (e.g., airport), the taxi company may estimate the number of taxi cabs that may be needed at the airport. Thus, for example, if 1,000 people are determined to be at the airport, and individuals have, on average, a 13% likelihood of hailing a cab, then it may be estimated that 130 taxi cabs may be needed at the airport during some period of time. A message related to the estimated sales level may be transmitted to a user interface associated with the taxi company, such as a printer, display monitor, wireless mobile device, and/or email account, for example.

A further operation of the static population density map process may involve providing goods or services by determining the appropriate location for each service provider based on the predicted customer base and/or determining the appropriate quantity of service providers, service activity, and/or goods to be provided at individual locations of interest based at least in part on the predicted customer base proximate to that location. Still using the taxi company as an example, if a city has two airports needing taxi service, the demand at both airports may be considered when dispatching taxi cabs to one airport or the other. For example, if 120 taxis are needed at airport A and 80 taxis are needed at airport B, but the company has only 150 taxis, then the company may dispatch 90 of the taxis (60%) to airport A and 60 (40%) of the taxis to airport B. Continuing this example, if fares at airport A are historically higher than fares at airport B, and/or have a higher profit margin, then the company may dispatch 120 taxis to airport A and the 30 remaining taxis to airport B. If profitability warrants, the taxi company may even dispatch more than 120 taxis to airport A to increase the probability that no available fares are missed at airport A in the event that the estimate of 120 needed taxis turns out to be low.

Population Activity Map I

In one embodiment contemplated by the present disclosure, a population activity map may be provided. A first operation of this process may include determining the location of individual accessible phone and/or data terminal customers. For example, mobile devices 112 within the geographic area of a central office 116, and/or the wireless carriers of such mobile devices, may report the exact locations of the mobile devices within the geographic area to central office 116.

As alluded to above, determining the location of individual accessible phone and/or data terminal customer may possibly involve aggregating data from multiple sources. For example, data from the wireless service carriers, cell phone towers, third parties connected to the wireless service carriers or cell phone towers, and/or from the mobile devices themselves may be collected and/or integrated together by central office 116.

Another operation of the population activity map process may involve comparing the location of individual accessible phone and/or data terminal customers to prior locations. For example, the current location of a mobile device 112 may be compared to an immediately previous location of that same mobile device 112.

Yet another operation of the population activity map process may involve using the displacement of individual customers and/or the time between measurements to determine an activity level for individual customers. For example, the current location of individual mobile devices 112 may be compared to their immediately previous locations to determine trends in where people are going. The time between measurements, coupled with the location displacement of the people, may indicate the speed and/or direction in which the people are moving, and hence the time at which they may be able to reach provider 118. The speed at which people move may also be used as an indication of their level of conviction in moving in their current direction. For instance, the faster people move, the more likely it may be that they will continue moving in same direction in which they are currently moving.

Still another operation of the population activity map process may involve assigning the activity levels to regions. For example, individual central offices 116 may be associated with respective geographic regions, such as an area in which potential common customers and/or clients of retailers within the geographic region may be congregated. In one embodiment, the geographic region may be a predetermined rectangular area within a city, such as a one mile by one mile square. In other embodiments, the geographic region may be defined at least in part by barriers to travel (e.g., foot travel), such as a river, highway, lake, private property, fence, and/or difficult terrain, for example. Thus, central office 116 may determine in which of the geographic regions that individual moving mobile devices 112 are disposed. In one embodiment, only those mobile devices 112 moving at at least a minimum threshold speed and/or within a range of directions may be assigned to geographic regions.

A further operation of the population activity map process may involve estimating the activity level of a population of interest for each region. For people who realistically qualify as a potential client and/or customer for a particular provider 118, their direction, frequency, speed and/or degree of movement may be determined at least partially by comparing current locations to previous locations at certain times in the past. The previous locations may include the immediately preceding location and/or locations that were determined further back in time. In one embodiment, the activity level of a population of interest may be estimated by accessing stored demographic and/or historical information about individual detected clients. For example, central office 116 may retrieve demographic and/or historical information about mobile devices 112 from memory device 120. The historical information may include previous locations of individual mobile devices 112.

Estimating the activity level of a population of interest may also involve filtering and/or weighting detected potential clients according to search criteria. For example, the detected population of mobile device 112 users may be broken down by the sex, age, income level, and/or place of residence of the users. Estimating the activity level of a population of interest may further involve applying an estimation function to predict the actual potential customer base. This function may depend on: detected client locations; client demographic and historical information, the source of client location data, the day of week and time-of-day, the activity level of each client, the aggregate activity level within each region, and/or the change in activity level over time. For example, a formula and/or lookup table may be used to estimate respective expected levels of sales for individuals detected within the region. Variables in the formula/lookup table may include the current location of the person, his demographic and/or historical location information, how reliable the source of the client location data is, the day of the week, time-of-day, and/or season of the year, the person's level of movement, the average and/or composite activity level of the potential clients within a region, and/or a change in a level of activity of individuals and/or groups of people over time. The formula/lookup table may be at least partially based on and/or derived from historical sales data, which data may relate to any of the variables and/or parameters used in the formula.

In one example, a restaurant selling pizza by the slice may have derived a formula based on historical data for the likelihood that an individual within a half-mile radius of the restaurant will purchase a slice of pizza within the restaurant within the next ten minutes. According to the formula, the likelihood may be estimated as the sum total of seven parameters that depend on the above-described variables. For instance, the first parameter may be 0.0002 if the person is in a shopping mall a few blocks away, 0.0011 if the person is in a movie theater one block away, and/or 0.0006 if the person is in an area between the mall and the theater. The second parameter may be 0.0003 if the person lives in a county, and 0.0008 if he does not. The third parameter may be 0.0006 if the user location data was received from a wireless service provider or cell phone tower, and 0.0003 if received from a less reliable third party. The fourth parameter may be 0.0007 during a one hour lunch time or a one hour dinner time, and 0.0003 at all other times. The fifth parameter may be 0.0008 if the person is walking at a pace of at least three miles an hour and is getting closer to the restaurant, and 0.0001 if he does not meet these qualifications. The sixth parameter may be 0.0007 if the crowd of potential customers, on average, is closer to the restaurant than it was ten seconds ago, and 0.0005 if it is not. The seventh parameter may be 0.0009 if an individual, or the crowd of potential customers, on average, is moving faster than it was thirty seconds ago, and 0.0004 is he/they is/are not. Thus, assuming that it is determined that a person is in the theater (0.0011), he lives in the county (0.0003), his information was received from a wireless service provider (0.0006), it is currently during the lunch hour (0.0007), the person is not getting closer to the restaurant (0.0001), the crowd is closer than they were ten seconds ago (0.0007), and the person is moving faster than he was thirty seconds ago (0.0009), then the formula may indicate a probability of 0.0044, or 0.44 percent, that the person will visit the restaurant for a slice of pizza within the next ten minutes. By summing the estimated probabilities for each person determined to be in the region (e.g., within a half-mile of the restaurant), the restaurant may estimate the number of pizza slices that will be needed within the next ten minutes. Thus, for example, if 10,000 people are determined to be within a half-mile of the restaurant, and each person has, on average, a 0.37% likelihood of ordering a slice of pizza, then it may be estimated that 37 slices of pizza will be needed in the next ten minutes.

A further operation of the population activity map process may involve providing goods and/or services by: determining the appropriate time to provide the goods and services based on activity level and/or changes in activity level; determining the appropriate location for individual service providers based at least partially on the predicted customer base; and/or determining the appropriate quantity of service providers, service activity, and/or goods to be provided at individual locations of interest based at least in part on the predicted customer base proximate to that location. Using the example of a taxi company operating in the region of the above-described pizza restaurant, the company may decide to send additional taxis to the region within five minutes if it is determined that there is an increasing level of movement from a restaurant district within the region towards a theater district within the region. In addition, the taxi company may decide to send the additional taxis specifically to an area between the restaurant district and the theater based at least in part on a predicted need in that area. Further, the taxi company may decide on a number of taxis to dispatch to the region based at least partially on a number of people currently in the region who meet demographic qualifications, e.g., income level.

Population Activity Map II

In one embodiment contemplated by the present disclosure, a population activity map may be provided, but in a process that may be different in some respects from the Population Activity Map I process described above. A first operation of this process may include determining the number of phones and/or wireless data terminals in contact with a single cell and/or access point for individual such cells and/or access points in a mapped area. For example, individual wireless access points and/or base stations in a geographic region may determine and/or continuously update the number of mobile devices that the access point is in communication with at any time.

As alluded to above, determining the number of phones and/or wireless terminals in a mapped area may possibly involve aggregating data from multiple sources. For example, data from individual wireless access points and/or base stations within the mapped area may be gathered by a central office 116.

Another operation of the population activity map process may involve creating a client flow map that represents the identity, speed, and direction of client flow from one base station region to another. Creating the client flow map may involve using: the change in the number of client terminals in contact with individual base station, information about clients that move from contact with one base station to another, information about clients that add contact to a new base station, and information about clients that lose contact with one of a plurality of base stations. For example, the client flow map may be a mathematical representation of movements of groups of individuals, and/or their demographics, between regions within a mapped area.

Yet another operation of the population activity map process may involve using the flow information of individual customers and/or the time between measurements to determine an activity level for an individual customer. For example, the current locations of individual mobile devices 112 may be compared to their immediately previous locations to determine trends in where people are going. The time between measurements, coupled with the location displacement of the people, may indicate the speed and/or direction in which the people are moving, and hence the time at which they may be able to reach provider 118. The speed at which people move may also be used as an indication of their level of conviction in moving in their current direction. For instance, the faster people move, the more likely it may be that they will continue moving in same direction in which they are currently moving.

Other operations of the Population Activity Map II process may involve assigning activity levels to regions, estimating the activity level of a population of interest for each region and/or providing goods and/or services. These three operations may be substantially similar to the corresponding operations described above with respect to the Population Activity Map I process, and thus are not described in detail here in order to avoid needless repetition.

Population Activity Map III

In another embodiment contemplated by the present disclosure, a population activity map may be provided, but in a process that may be different in some respects from the Population Activity Map I and II processes described above. A first operation of this process may include determining the number of phones and/or wireless data terminals in contact with a single cell and/or access point for individual such cells and/or access points in a mapped area. For example, individual wireless access points and/or base stations in a geographic region may determine and/or continuously update the number of mobile devices that the access point is in communication with at any time.

As alluded to above, determining the number of phones and/or wireless terminals in a mapped area may possibly involve aggregating data from multiple sources. For example, data from individual wireless access points and/or base stations within the mapped area may be gathered by a central office 116.

Another operation of the population activity map process may involve creating a client flow map that represents the quantity of customers, average speed, and/or direction of client flow from one base station region to another. Creating the client flow map may involve using: the change in the number of client terminals in contact with individual base stations, information about clients that move from contact with one base station to another, information about clients that add contact to a new base station, and/or information about clients that lose contact with one of a plurality of base stations. For example, the client flow map may be a mathematical representation of movements of groups of individuals, including their average speed and/or direction of movement, between regions within a mapped area.

Yet another operation of the population activity map process may involve using the flow information within each region to determine an activity level for that region. For example, the average location, and/or center of gravity, of the group of mobile devices 112 may be compared to a previous (such as its immediately previous) average location to determine trends in where people are going. The time between measurements, coupled with the location displacement of the group of people, may indicate the speed and/or direction in which the group of people are moving, and hence the time at which they may be able to reach provider 118, on average.

A further operation of the population activity map process may involve providing goods and/or services by: determining the appropriate time to provide the goods and/or services based at least in part on activity level and/or changes in activity level; determining the appropriate location for individual service providers based at least partially on the activity level; and/or determining the appropriate quantity of service providers, service activity, and/or goods to be provided at individual locations of interest based at least in part on the activity level proximate to that location. Again using the example of a taxi company operating in the region of the above-described pizza restaurant, the company may decide to send additional taxis to the region within five minutes if it is determined that there is an increasing level of movement from a restaurant district within the region towards a theater district within the region. In addition, the taxi company may decide to send the additional taxis specifically to an area between the restaurant district and the theater based on a predicted need in that area. Further, the taxi company may decide on a number of taxis to dispatch to the region based on a number of people currently in the region.

Transaction Likelihood Map

In another embodiment contemplated by the present disclosure, a transaction likelihood map may be provided. A first operation of this process may include determining the location of individual accessible phone and/or data terminal customers. For example, mobile devices 112 within the geographic area of a central office 116, and/or the wireless carriers of such mobile devices, may report the exact locations of the mobile devices within the geographic area to central office 116.

As alluded to above, determining the location of individual accessible phone or data terminal customers may possibly involve aggregating data from multiple sources. For example, data from the wireless service carriers, cell phone towers, third parties connected to the wireless service carriers or cell phone towers, and/or from the mobile devices themselves may be collected and/or integrated together by central office 116.

Another operation of the transaction likelihood map process may involve comparing the location of individual accessible phone and/or data terminal customers to prior locations. For example, the current location of a mobile device 112 may be compared to an immediately previous location of that same mobile device 112.

Yet another operation of the transaction likelihood map process may involve using the displacement of individual customers and/or the time between measurements to determine an activity level for individual customers. For example, the current location of individual mobile devices 112 may be compared to their previous (such as immediately previous) locations to determine trends in where people are going. The time between measurements, coupled with the location displacement of the people, may indicate the speed and/or direction in which the people are moving, and hence the time at which they may be able to reach provider 118. The speed at which people move may also be used as an indication of their level of conviction in moving in their current direction. For instance, the faster people move, the more likely it may be that they will continue moving in same direction in which they are currently moving.

Still another operation of the transaction likelihood map process may involve using the activity level of individual customers and/or the direction of motion to predict a time and/or place of a likely transaction with individual customers. For example, the speed and/or direction in which a particular mobile device 112 is currently moving may be extrapolated to determine a time at which mobile device 112 will be closest to provider 118, and that time may be deemed the most likely time at which the owner of mobile device 112 will make a purchase from provider 118. If provider 118 is also mobile, then the prediction may take into account future movements by provider 118 intended to cause the paths of mobile device 112 and provider 118 to intersect in space and time such that mobile device 112 and provider 118 may engage each other.

A further operation of the transaction likelihood map process may involve assigning the likely transactions to regions and time periods. For example, individual central offices 116 may be associated with respective geographic regions, such as an area in which potential common customers and/or clients of retailers within the geographic region may be congregated. In one embodiment, the geographic region may be a predetermined rectangular area within a city, such as a one mile by one mile square. In other embodiments, the geographic region may be defined at least in part by barriers to travel (e.g., foot travel), such as a river, highway, lake, private property, fence, and/or difficult terrain, for example. Thus, central office 116 may determine in which of the geographic regions that individual moving mobile devices 112 will be disposed during a time period in which mobile devices 112 are most likely to make a transaction with provider 118. In one embodiment, only those mobile devices 112 having at at least a minimum threshold likelihood of making a purchase from provider 118 may be assigned to geographic regions and time periods.

A further operation of the transaction likelihood map process may involve estimating the transaction likelihood of a population of interest for each region and time period. In one embodiment, the activity level of a population of interest may be estimated by accessing stored demographic and historical information about each detected client. For example, central office 116 may retrieve demographic and/or historical information about mobile devices 112 from memory device 120. The historical information may include previous locations of individual mobile devices 112.

Estimating the transaction likelihood of a population of interest may also involve filtering and/or weighting detected potential clients according to search criteria. For example, the detected population of mobile device 112 users may be broken down by the sex, age, income level, and/or place of residence of the users. Estimating the transaction likelihood of a population of interest may further involve applying an estimation function to predict the probability of a transaction for individual regions and time periods. This function may depend on: detected client locations during the time period, historical transaction rates for individual regions in individual time periods, client demographic and/or historical information, source of client location data, the day of week and/or time-of-day, the activity level of individual clients, the aggregate activity level within each region, and/or the change in activity level over time. For example, a formula and/or lookup table may be used to estimate an expected level of sales during a given time period for individuals detected within the region. Variables in the formula/lookup table may include the current location of the person, the historical sales made in the region during analogous past time periods, the person's demographic and historical location information, how reliable the source of the client location data is, the day of the week, time-of-day, and/or season of the year, the person's level of movement, the average or composite activity level of the potential clients within a region, and/or a change in a level of activity of individuals and/or groups of people over time. The formula/lookup table may be based at least in part on or derived from historical sales data, which data may relate to any of the variables or parameters used in the formula.

Again using the example of a restaurant selling pizza by the slice, the restaurant may have derived a formula based on historical data for the likelihood that an individual within a half-mile radius of the restaurant will purchase a slice of pizza within the restaurant within the next ten minutes. According to the formula, the likelihood may be estimated as the sum total of the seven parameters discussed above with regard to the Population Activity Map process with the addition of an eighth parameter in the form of historical transaction rates for individual regions in individual time periods. For instance, the restaurant may retrieve from its own records that 43 slices of pizza were sold in the same second Saturday in May in the same 12:10 pm to 12:20 pm time period. The restaurant's previous estimate of 37 slices to be sold may be biased toward the historical transaction rate with a weighting factor to be selected by the restaurant. For instance, if the restaurant were to assign the historical transaction rate with a weighting factor of 0.5, then the estimate of 37 slices may be moved half-way toward the historical rate of 43 slices to arrive at a final estimate of 40 slices to be sold in the ten minute period.

A further operation of the transaction likelihood map process may involve providing goods and/or services by: determining the appropriate time to provide the goods and/or services based on transaction likelihood, determining the appropriate location for individual service providers based on the transaction likelihood, and/or determining the appropriate quantity of service providers, service activity, and/or goods to be provided at individual locations of interest based on the transaction likelihood proximate to those locations. Using the example of a taxi company operating in the region of the above-described pizza restaurant, the company may decide to send additional taxis to the region within five minutes if it is determined that there is an increasing likelihood of transaction within the region. In addition, the taxi company may decide to send the additional taxis specifically to an area between the restaurant district and the theater based on a transaction likelihood in that particular area. Further, the taxi company may decide on a number of taxis to dispatch to the region based on transaction likelihood in the region.

Figure 3:
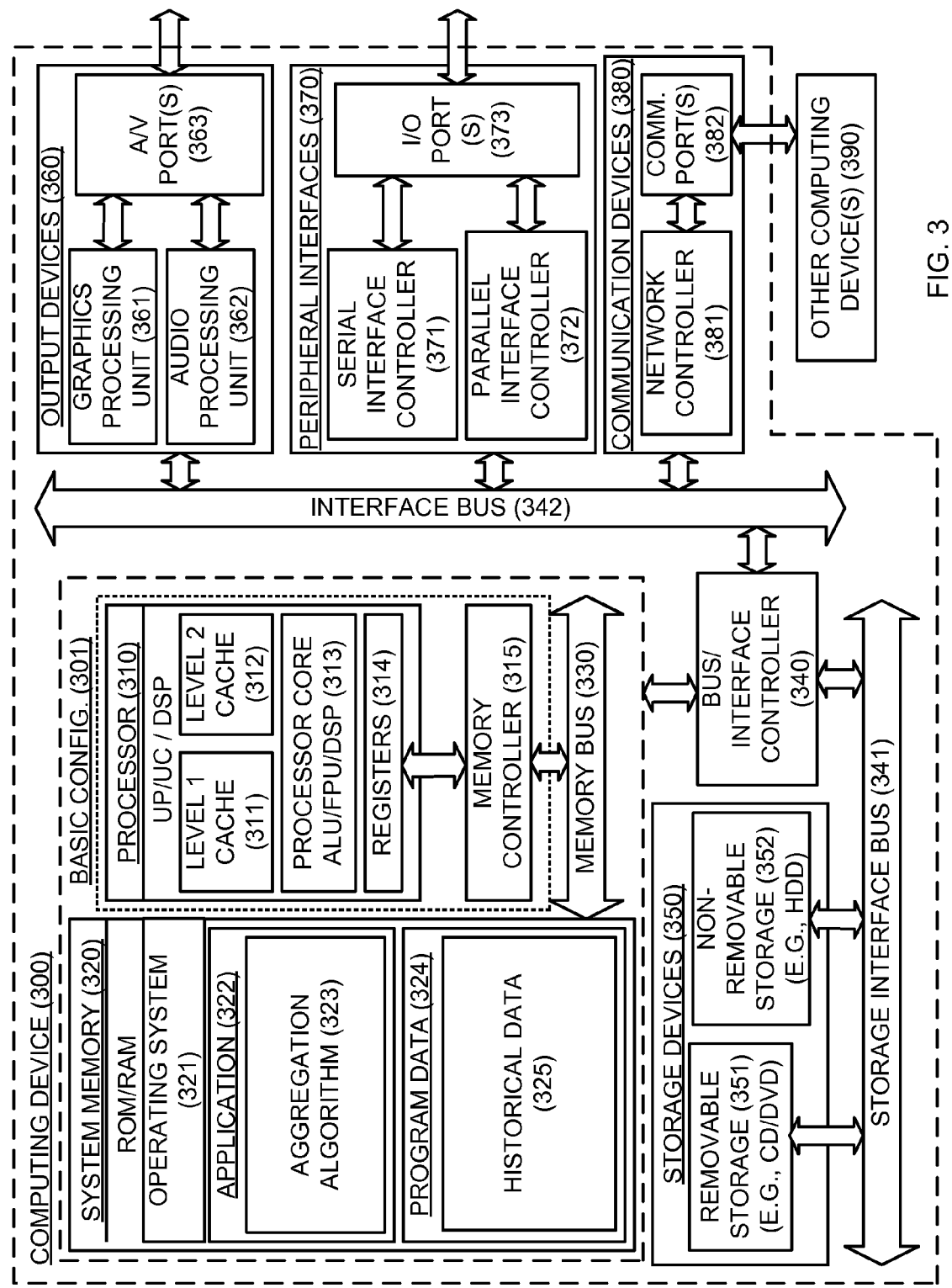
FIG. 3 is a block diagram illustrating an example computing device that may be arranged for telemetrics-based location and/or tracking.

With reference to FIG. 3, depicted is a block diagram illustrating an example computing device 300 that is arranged for telemetrics based location and/or tracking implementations in accordance with at least some embodiments of the present disclosure. In a very basic configuration 301, computing device 300 typically includes one or more processors 310 and system memory 320. A memory bus 330 may be used for communicating between the processor 310 and the system memory 320.

Depending on the desired configuration, processor 310 may be of any type including but not limited to a microprocessor (μP), a microcontroller (μC), a digital signal processor (DSP), or any combination thereof. Processor 310 may include one more levels of caching, such as a level one cache 311 and a level two cache 312, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.) or any combination thereof. System memory 320 may include an operating system 321, one or more applications 322, and program data 324. Application 322 may include a mobile device telemetrics data aggregation algorithm 323 that is implemented to add together and integrate the identities, demographic information and/or historical information related to the mobile devices within the geographic region. Program Data 324 may include historical mobile device telemetrics data 325. In some embodiments, application 322 may be arranged to operate with program data 324 on an operating system 321 to effectuate the aggregation of the mobile device data. This described basic configuration is illustrated in FIG. 3 by those components within dashed line 301.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 320, removable storage 351 and non-removable storage 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more A/V ports 363. Example peripheral interfaces 370 include a serial interface controller 371 or a parallel interface controller 372, which may be configured to communicate with external devices such as input devices (e.g., keyboard, mouse, pen, voice input device, touch input device, etc.) or other peripheral devices (e.g., printer, scanner, etc.) via one or more I/O ports 373. An example communication device 380 includes a network controller 381, which may be arranged to facilitate communications with one or more other computing devices 390 over a network communication via one or more communication ports 382. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 300 may also be implemented as a personal computer including both laptop computer and non-laptop computer configurations or as a server or mainframe.

According to one embodiment, computing device 300 is connected in a networking environment such that the processor 310, application 322 and/or program data 324 may perform with or as a computer system in accordance with embodiments herein.

Figure 4:
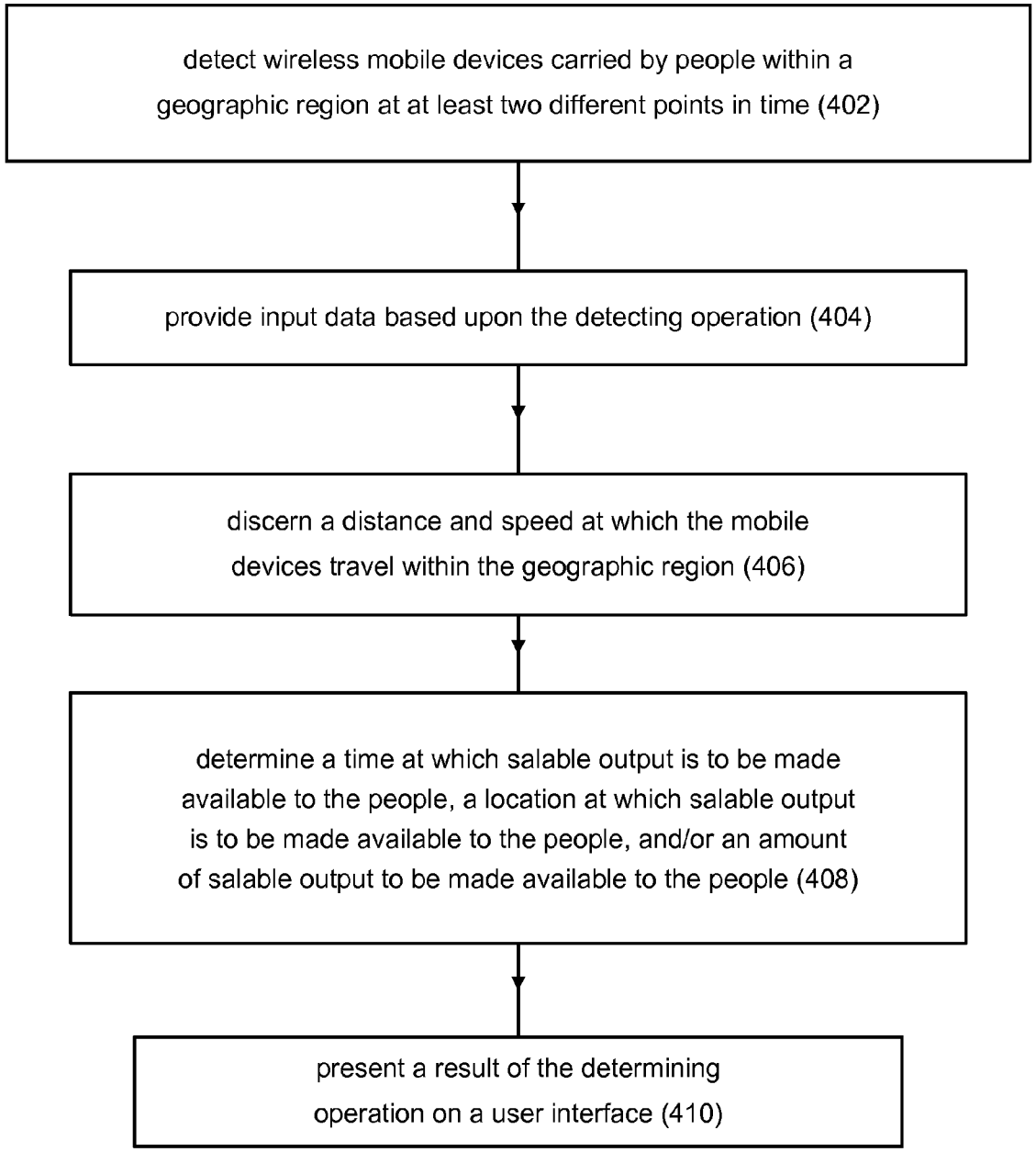
FIG. 4 is a flow chart showing the operation of an example population activity mapping method.

FIG. 4 is a flowchart showing the operation of an example population activity mapping method 400, as contemplated by at least some embodiments of the present disclosure. The example embodiments may include one or more of processing operations 402, 404, 406, 408 and 410. Processing begins at operation 402, where wireless mobile devices carried by people within a geographic region are detected at at least two different points in time. For example, individual mobile devices 112 may be detected at at least two different times by use of GPS satellites 114, cellular base stations, and/or a wireless access point, as used in creating a Hot Spot in a public setting. In a specific example, mobile devices 112 may ascertain their locations within a geographic region by use of GPS satellites 114, and may report their locations to central office 116.

Processing flows from operation 402 to operation 404. Operation 404 may include providing input data based upon the detecting operation. For example, mobile devices 112 may on a periodic basis transmit to central office 116 data including their global geographic coordinates and identities.

In operation 406, a distance and speed at which the mobile devices travel within the geographic region may be discerned. For example, based on changes in the reported location of a mobile device 112 over time, a processor within central office 116 may calculate a distance and speed at which the mobile device travels.

In a next operation 408, a time at which salable output is to be made available to the people, a location at which salable output is to be made available to the people, and/or an amount of salable output to be made available to the people may be determined. For example, based at least in part on a distance and speed at which mobile devices within the region are moving, goods and/or services may be provided at a time and place calculated to result in a high level of sales of the goods and/or services. Moreover, the goods and/or services may be provided in quantities and manpower levels calculated to satisfy the demand for the goods and/or services. The determination of times, locations and amounts may be made by a processor of a networked computer at central office 116 or by a processor of a networked computer at provider 118.

Next, in operation 410, a result of the determining operation may be presented on a user interface. For instance, a suggested time, location, and quantities for provider 118 to offer his goods/servicers may be printed on a printer, displayed on a monitor, and/or spoken on audio speakers that are associated with provider 118 and that are connected to the computer network.

In an example embodiment, an arrangement 100 for determining and collecting the location of a mobile device, and/or telemetrics-based location and tracking arrangement 200 may be configured to implement the method of FIG. 4.

Figure 5:
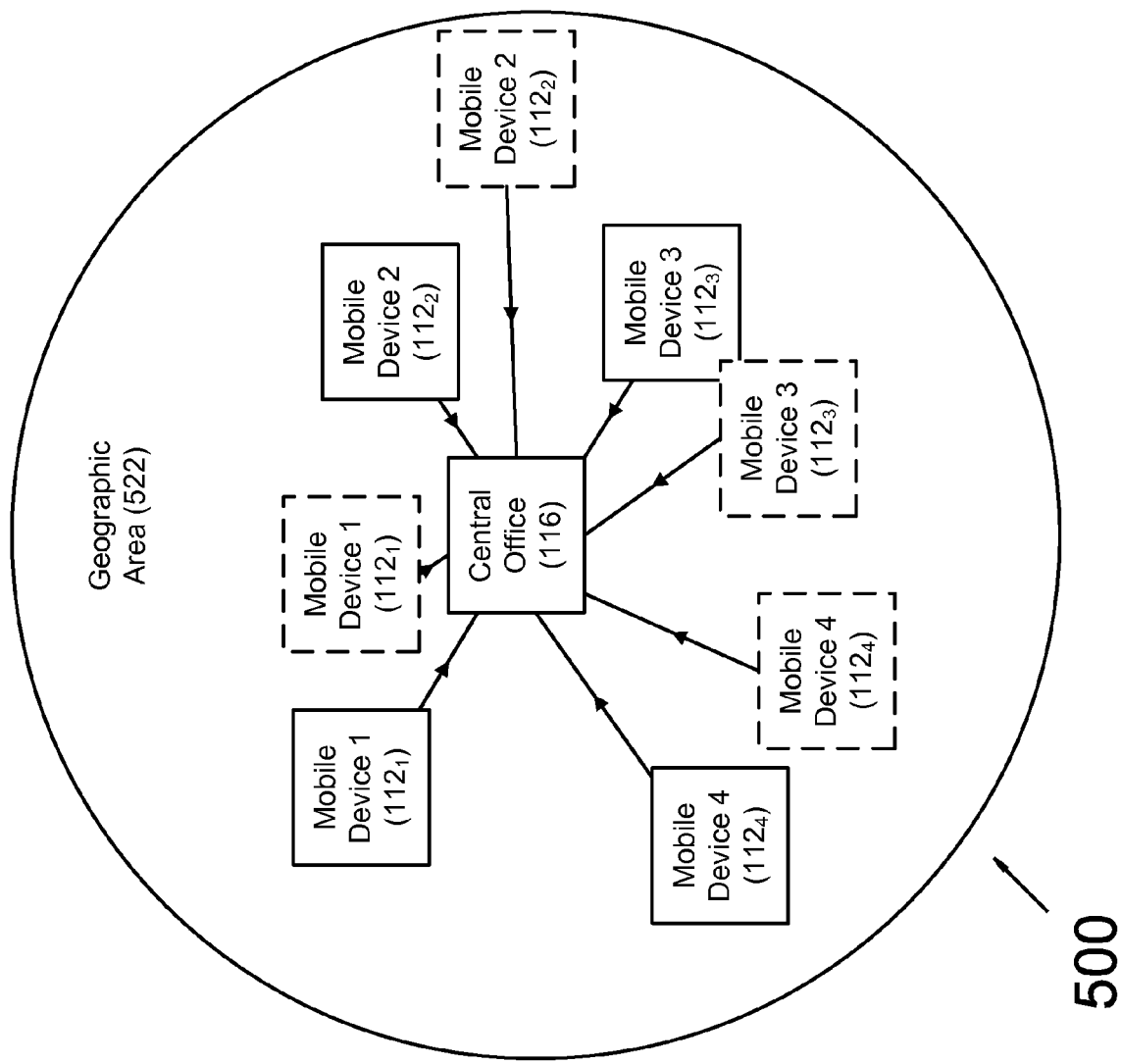
FIG. 5 is a diagram of a map, all arranged in accordance with at least some embodiments of the present disclosure.

A map 500 that may be used in at least some embodiments of the present disclosure is illustrated in FIG. 5. The present locations of mobile devices $112_{1-4}$ are indicated in solid rectangles, while previous locations of mobile devices $112_{1-4}$ are indicated in dashed rectangles. A static population density map may include the present locations of mobile devices $112_{1-4}$ disposed within a geographic area 522 of a central office 116. The mobile devices may be arranged to report their then-current locations to central office 116, as indicated by the arrows from the mobile devices to central office 116.

In creating a population activity map, the previous locations of each of the mobile devices, as indicated by the dashed rectangles, may be compared to its present location. These displacements of each of the individual mobile devices may be determined in conjunction with the length of time in which the displacement occurred. Thus, speeds and directions of movement of the mobile devices may be determined. In some embodiments, movements of mobile devices between different geographic areas 522 may be tracked.

In order to simplify the discussion of the above-described example embodiments, it may have been assumed that each of the mobile devices subscribes to a locating service or could be located by other means. In actuality, however, in any of the above-described embodiments, it may be possible to locate only a known percentage of the population of mobile devices. Accordingly, an estimation function may be used to predict the actual customer base. More particularly, since not everyone has a participating cell phone/PDA, information about subscription rates may be used to estimate an actual customer population. In a simple embodiment, this may be a single scaling factor. For example, if it is estimated that 10% of the population has a participating, trackable device, and one hundred devices are actually detected within a region, it may be estimated that there are 1000 people in the region. In a more sophisticated embodiment, this scaling function may be performed for each identifiable demographic, and the estimated total number of people within each demographic may be added together. That is, assuming a trackable participation rate $T_i$ for each independent segment i of the population, and $P_i$ detected individuals within each segment, then the total population could be estimated as the sum of $P_i/T_i$ for all values of i.

The determination of the speed and direction of movement of the individual wireless devices have been described in at least some of the above example embodiments as being calculated by a computer network. However, it is also possible within the scope of the invention for the individual wireless devices to calculate their own speed and direction of movement and then report such speed and direction to a computer network.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for mapping population activity, the method comprising:
   detecting wireless mobile devices within a geographic region at two or more different points in time;
   discerning a location, speed and direction of the wireless mobile devices within the geographic region to discern a particular location toward which the wireless mobile devices are moving;
   determining, based upon the location, speed, direction and the particular location toward which the wireless mobile devices are moving:
   a time at which goods or services are to be made available;
   a location at which the goods or services are to be made available; and
   a quantity of the goods or services to be made available, the determining being performed by one or more processors of a computer network; and
   presenting a result of the determining on a user interface of the computer network.

2. The method of claim 1, wherein individual wireless mobile devices include a processor, a transmitter, and a receiver; and wherein the detecting is performed by use of one or more of a wireless access point, a GPS satellite, and/or a base station.

3. The method of claim 2, wherein the discerning is performed by either at least one of the one or more processors of the computer network, or the processor of at least one of the individual wireless mobile devices.

4. The method of claim 1, further comprising collecting demographic information associated with at least some of the wireless mobile devices, wherein the determining is at least partially dependent upon the demographic information.

5. The method of claim 1, further comprising retrieving historical information from a memory device, wherein the determining is at least partially dependent upon the historical information.

6. The method of claim 1, wherein the determining is at least partially dependent upon one or more of a present time-of-day, a present day-of-the-week, and/or a present calendar date.

7. The method of claim 1, wherein the determining is at least partially dependent upon a change over time in a number of the wireless mobile devices that are detected.

* * * * *